United States Patent
Gottis

(10) Patent No.: US 8,912,254 B2
(45) Date of Patent: Dec. 16, 2014

(54) POWDER COATING COMPOSITION

(75) Inventor: Philippe Gottis, St. Louis (FR)

(73) Assignee: Huntsman International LLC, The Woodlands, TX (US)

( * ) Notice: Subject to any disclaimer, the term of this patent is extended or adjusted under 35 U.S.C. 154(b) by 299 days.

(21) Appl. No.: 13/147,413

(22) PCT Filed: Jan. 28, 2010

(86) PCT No.: PCT/EP2010/051013
§ 371 (c)(1),
(2), (4) Date: Aug. 2, 2011

(87) PCT Pub. No.: WO2010/089242
PCT Pub. Date: Aug. 12, 2010

(65) Prior Publication Data
US 2011/0288201 A1    Nov. 24, 2011

(30) Foreign Application Priority Data
Feb. 9, 2009 (EP) .................................... 09152363

(51) Int. Cl.
| | |
|---|---|
| C08J 3/20 | (2006.01) |
| C09D 4/06 | (2006.01) |
| C09D 133/20 | (2006.01) |
| C08K 3/22 | (2006.01) |
| C08J 3/22 | (2006.01) |
| C09D 5/03 | (2006.01) |
| C09D 167/00 | (2006.01) |
| C09D 133/02 | (2006.01) |
| C09D 133/06 | (2006.01) |
| C08L 63/00 | (2006.01) |
| C08K 5/00 | (2006.01) |

(52) U.S. Cl.
CPC ................ *C09D 4/06* (2013.01); *C09D 133/20* (2013.01); *C08L 63/00* (2013.01); *C08K 3/22* (2013.01); *C08J 3/226* (2013.01); *C09D 5/033* (2013.01); *C09D 167/00* (2013.01); *C09D 133/02* (2013.01); *C08K 5/0025* (2013.01); *C08J 2463/00* (2013.01); *C09D 133/06* (2013.01)
USPC ............ 523/351; 523/427; 523/428; 523/458

(58) Field of Classification Search
USPC .................................. 523/351, 427, 428, 458
See application file for complete search history.

(56) References Cited

U.S. PATENT DOCUMENTS

| | | | | |
|---|---|---|---|---|
| 4,485,199 | A | * | 11/1984 | Kordomenos et al. ........ 523/400 |
| 5,025,067 | A |   | 6/1991  | Yamamoto et al. |
| 5,990,189 | A | * | 11/1999 | Hall et al. ........................ 522/79 |
| 6,433,084 | B1 | * | 8/2002  | Gottis ............................. 525/119 |
| 2006/0142403 | A1 | * | 6/2006 | Sugiura et al. ................. 521/134 |
| 2007/0248825 | A1 |   | 10/2007 | Bolks et al. |

FOREIGN PATENT DOCUMENTS

| | | |
|---|---|---|
| DE | 19907957 | 9/1999 |
| EP | 0503865 | 9/1992 |
| EP | 0600546 A1 | 6/1994 |
| JP | S57162764 | 10/1982 |
| JP | S58113267 | 7/1983 |
| JP | H0420518 | 1/1992 |
| JP | 10-27981 | 10/1998 |

* cited by examiner

*Primary Examiner* — Hannah Pak

(57) ABSTRACT

A masterbatch composition, a method for the preparation of a masterbatch composition, a method for the preparation of a powder coating composition, a powder coating composition obtainable by said method as well as the use of a masterbatch composition for a powder coating composition or for increasing the opacity of a cured powder coating is disclosed.

11 Claims, No Drawings

POWDER COATING COMPOSITION

CROSS REFERENCE TO RELATED APPLICATIONS

This application is the National Phase of International Application PCT/EP2010/051013 filed Jan. 28, 2010 which designated the U.S. and which claims priority to European (EP) Pat. App. No. 09152363.9 filed Feb. 9, 2009. The noted applications are incorporated herein by reference.

The present invention relates to a masterbatch composition, a method for the preparation of a masterbatch composition, a method for the preparation of a powder coating composition, a powder coating composition obtainable by said method as well as the use of a masterbatch composition for a powder coating composition or for increasing the opacity of a cured powder coating.

On basis of the techniques disclosed in the prior art it is difficult to incorporate high amounts of titanium dioxide in a powder coating composition. Generally, the $TiO_2$ particles are melt mixed in an extruder together with the other components of the powder coating composition. The amount of $TiO_2$ particles which can be incorporated in powder coating compositions of the prior art can reach levels up to a range of 35 to 40 wt.-%, based on the total amount of the powder coating composition. However, powder coating compositions on basis of conventional polyesters and epoxy resins lead to the degradation of the surface smoothness once the amount of $TiO_2$ particles is at the highest level, i.e., 40 wt.-%. Consequently, the amount of $TiO_2$ in powder coating composition is limited to a range of 35 to 40 wt.-%. The resulting opacity of the coatings is poor, i.e. full coverage can only be obtained at a relatively high film thickness of approximately 80 to 90 μm. The opacity of white pigmented powder coatings is much lower than that of liquid paints, e.g. alkyd paints which are made of alkyd resin. The limitation of opacity is most of all a problem for white pigmented and light shade powder coatings. This is most likely attributed to the poor dispersibility of the titanium dioxide in the polymer matrix.

Additionally, the incorporation of high amounts of titanium dioxide requires more mixing time and energy in an extruder which however leads to less output. Moreover, according to the prior art an increase of the amount of titanium dioxide above 40 wt.-% does not lead to a further increase in opacity.

US 2007/0248825 A1 discloses powder coating compositions comprising at least a resin, at least one anti-bridging agent and at least 40 wt.-% of a pigment. However, even though the amount of pigment has been increased to a level up to more than 40 wt.-% the opacity of the coatings obtained is not significantly increased.

SUMMARY OF THE INVENTION

It was an object of the present invention to provide a powder coating composition which can be converted to cured powder coatings having an increased opacity and to provide a special resin system for this purpose. Further, it was an object of the present invention to provide powder coatings with reduced film thicknesses, thus saving coating material and cure energy.

It has surprisingly been found that a composition comprising a high amount of $TiO_2$ particles together with epoxy resins having non-terminal unsaturated groups or a mixture of an epoxy resin and an unsaturated organic compound having non-terminal unsaturated groups can be used to increase the opacity of powder coatings.

DETAILED DESCRIPTION OF THE INVENTION

A first embodiment of the invention is a composition comprising
a) at least 50 wt.-% of $TiO_2$ particles and
b) at least 10 wt.-% of a component which comprises
b1) at least one epoxy resin having at least one carbon-carbon double bond and/or at least one carbon-carbon triple bond which are not terminal; or
b2) a mixture of
i) at least one epoxy resin without a carbon-carbon double bond and without a carbon-carbon triple bond and
ii) at least one unsaturated organic compound (A) having at least one carbon-carbon double and/or at least one carbon-carbon triple bond which are not terminal and wherein the weight ratio of component i) to ii) ranges from 1000:1 to 10:5; or
b3) any mixture of b1) and b2),
wherein the weight % is based on the total weight of the composition.

An essential component of the composition according to the present invention is titanium dioxide ($TiO_2$) which is present in the form of particles. Titanium dioxide is the most widely used pigment due to its brightness and very high refractive index in which it is surpassed only by a few other materials. $TiO_2$ is also an effective opacifier in powder form, where it is employed as a pigment to provide opacity to products such as paints, coatings, plastics, papers, inks, foods, medicines as well as tooth pastes.

The composition according to the present invention comprises at least 50 wt.-%, preferably at least 55 wt.-% of $TiO_2$ particles wherein the amount is based on the total weight of the composition.

According to a preferred embodiment of the present invention, the titanium dioxide particles are present in the composition in an amount ranging from 60 to 90 weight percent, preferably 62 to 85 weight percent and most preferably 65 to 80 weight percent, based on the total weight of the composition.

The opacity is improved by optimal particle size of the titanium dioxide particles. Therefore, according to a preferred embodiment of the present invention the composition comprises particles of titanium dioxide having an average particle size of 0.05 to 0.5 μm, preferably 0.08 to 0.4 μm and more preferably 0.1 to 0.3 μm determined according to BS ISO 13318-3:2004: Centrifugal X-ray method.

According to a preferred embodiment the composition of the present invention comprises $TiO_2$ particles having an oil absorption capacity of 12 to 22 $cm^3$/100 g, preferably 14 to 20 $cm^3$/100 g, most preferably of 16 to 19 $cm^3$/100 g determined according to palette-knife-method-ISO 787, part 5.

Titanium dioxide particles within the meaning of the present invention are particles comprising at least 90 weight percent of titanium dioxide based on the total weight of the individual particle. According to a preferred embodiment the titanium dioxide particles are surface treated with oxides selected from the group of metals consisting of aluminium, silicon, zirconium and any mixture thereof.

In order to improve the processability of the $TiO_2$ particles the surface of said particles are preferably treated with organic components.

Examples of commercially available $TiO_2$ particles suitable for use herein include Kronos® 2160, 2340, 2315, 3645, 2222, 2305 available from Kronos; Ti-Pure® 706, 960 available from Du Pont; Tiona® 595 available from Millennium; and Tioxide TR92® or TR 81® ex Huntsman.

Component b):

The composition according to the present invention further comprises b) which is b1) or b2) or b3) in an amount of at least 10 wt.-%, based on the total weight of the composition.

Component b1) comprises at least one epoxy resin having a carbon-carbon double bond or a carbon-carbon triple bond which is not terminal.

Mixture b2) comprises
i) at least one epoxy resin without a carbon-carbon double bond and without a carbon-carbon triple bond and
ii) at least one unsaturated organic compound (A) having at least one carbon-carbon double or at least one carbon-carbon triple bond which is not terminal and wherein the weight ratio of component i) to ii) ranges from 1000:1 to 10:5.

b3) is any mixture of b1) and b2).

Preferably, component b1) or mixture b2) or b3) is present in the masterbatch in an amount of at least 15 wt.-%, based on the total weight of the composition.

Preferably, component b1) or mixture b2) or b3) is present in an amount ranging from 10 to 45 weight percent, preferably 15 to 40 weight percent and most preferably 20 to 35 weight percent, based on the total weight of the composition.

Significantly improved results in terms of opacity of cured powder coating compositions can be obtained with a composition wherein the weight ratio of component a) to component b) is within a certain range. Therefore, according to a preferred embodiment, the weight ratio of component a) to component b) is 4:1 to 11:9, preferably 3.5:1 to 1.5:1 and more preferably 7:3 to 1.5:1.

Component b1):

Component b1) comprises at least one epoxy resin having at least one carbon-carbon double bond and/or at least one carbon-carbon triple bond which is not terminal. An epoxy resin within the meaning of the present invention is an organic component comprising at least one epoxy group.

Component b1) is preferably obtainable/obtained by the reaction of an epoxy resin with an unsaturated organic component (B) which has at least one carbon-carbon double bond and/or at least one carbon-carbon triple bond which are not terminal and at least one functional group which is capable of reacting with an epoxy group.

Preferably, component b1) is obtainable or can be obtained by the reaction of an epoxy resin with the unsaturated component (B) which has at least one carbon-carbon double bond and/or at least one carbon-carbon triple bond which are not terminal and at least one functional group selected from the group consisting of amino, hydroxy, carboxy and anhydride.

Unsaturated component (B) used to obtain component b1) has at least one carbon-carbon double or triple bond which is not terminal. Terminal means that the carbon-carbon double or triple bond is located at the end of a main chain or a side chain of a molecule. Further, according to a preferred embodiment the unsaturated component (B) is selected from the group consisting of cycloalkene, cycloalkyne, alkene, alkyne or any mixtures thereof which have at least one functional group which is capable to react with an epoxy group.

According to a further preferred embodiment the unsaturated component (B) which has at least one carbon-carbon double bond and/or at least one carbon-carbon triple bond which are not terminal is a functionalized homopolymer of butadiene or a copolymer of butadiene with a vinyl or allyl component selected from the group consisting of acrylonitrile, acrylic acid, methacrylic acid, acrylic acid or methacrylic acid esters, maleic acid and maleic acid anhydride.

The homopolymers or copolymers of butadiene are functionalized with groups which are capable of reacting with an epoxy group, preferably the functional groups are selected from the group consisting of amino, hydroxy, carboxy and anhydride. Functionalized homopolymers or copolymers of butadiene can be prepared by methods known to the person skilled in the art.

According to a further preferred embodiment the unsaturated component (B) which has at least one carbon-carbon double bond and/or at least one carbon-carbon triple bond which are not terminal is selected from the group consisting of unsaturated fatty acid, dimerized or trimerized unsaturated fatty acid, amine terminated butadiene acrylonitrile copolymer, carboxyl terminated butadiene acrylonitrile copolymer, functionalized and partly epoxydised polybutadiene, polyamidoamine based on an unsaturated fatty acid dimer or trimer, tetrahydrophthalic acid, tetrahydrophthalic anhydride, acetylene dicarboxylic acid, butyne diol, or any mixture or any reaction product thereof.

Especially preferred is component b1) which is obtainable or obtained by the reaction of an aromatic glycidyl ether, e.g. bisphenol A or F glycidyl ether or a bisphenol-A or -F based epoxy resin with an unsaturated organic component (B) selected from the group consisting of dimerized unsaturated fatty acid, amine terminated butadiene-acrylonitrile copolymer and carboxyl terminated butadiene acrylonitrile copolymer.

Mixture b2):

Mixture b2) comprises
i) at least one epoxy resin without a carbon-carbon double bond and without a carbon-carbon triple bond and
ii) at least one unsaturated organic compound (A) having at least one carbon-carbon double and/or one carbon-carbon triple bond which are not terminal and wherein the weight ratio of component i) to ii) ranges from 1000:1 to 2:1, preferably 500:1 to 10:4, more preferably 500:1 to 5:1, more preferably 200:1 to 10:3, and most preferably 200:1-5:1.

The epoxy resin b2)-i) is an epoxy resin without a carbon-carbon double bond and without a carbon-carbon triple bond. As already defined above an epoxy resin within the meaning of the present invention is an organic compound having at least one epoxy group.

The composition according to the present invention preferably comprises component b1) or epoxy resin b2)-i) having a softening temperature of at least 60° C., preferably at least 70° C., more preferably at least 80° C. and most preferably in a range of 85 to 120° C. determined according to DIN 51920 on a Mettler apparatus.

Further, a composition is preferred wherein component b1) or component b2)-i) have an epoxy content of at least 0.5 eq/kg, preferably in a range of 1.2 to 3.0 eq./kg and more preferably in a range of 1.25 to 1.6 eq./kg determined according to ISO 3001.

Component b2)-i) can be the same as the epoxy resin which is used as the starting material to be converted to component b1), i.e. prior to the reaction with the unsaturated organic component (B) which has at least one carbon-carbon double bond and/or at least one carbon-carbon triple bond which are not terminal.

Suitable epoxy resin include, for example, epoxidized oils wherein the oil is linseed oil, soybean oil, safflower oil, oiticica oil, caraway seed oil, rapeseed oil, castor oil, dehydrated castor oil, cotton seed oil, wood oil, vernonia oil (a natural oil), sunflower oil, peanut oil, olive oil, soybean leaf oil, maize oil, fish oil such as, for example, herring or sardine oil, and non-cyclic terpene oils. The epoxidized oil is preferably epoxidized soybean oil and/or epoxidized linseed oil.

Especially preferred epoxy resin b2)-i are glycidyl ethers of aromatic components having at least one phenolic hydroxyl group. Preferred are bisphenol A or bisphenol F diglycidyl ethers which are preferably further reacted with bisphenol A or bisphenol F, or any mixture thereof.

Unsaturated organic compound (A) (component b2)-ii) has at least a carbon-carbon double and/or a carbon-carbon triple bond which is not terminal. Preferably compound (A) does not react with the epoxy resin b2)-i). More preferably said unsaturated compound is selected from the group consisting of cycloalkene, cycloalkyne, alkene and alkyne. According to a preferred embodiment the unsaturated organic compound (A) is selected from the group of polybutadiene homopolymers and copolymers having no functional group capable of reacting with an epoxide group, partly epoxidised polybutadiene, esters of unsaturated fatty acids, esters of unsaturated fatty acid dimers and trimers, esters of unsaturated organic acids and anhydrides, esters of unsaturated alcohols, 4,4'-bismaleimidodiphenylmethane or any mixture thereof.

Preferably, the composition according to the present invention is solid at 25° C., e.g. 25° C. being the glass transition temperature of the composition.

A further embodiment of the present invention is a resin component/resins system b) which comprises
  b1) at least one epoxy resin having at least one carbon-carbon double bond and/or at least one carbon-carbon triple bond which is not terminal; or
  b2) a mixture of
  i) at least one epoxy resin without a carbon-carbon double bond and without a carbon-carbon triple bond and
  ii) at least one unsaturated organic compound (A) having at least one carbon-carbon double and/or at least one carbon-carbon triple bond which is not terminal and wherein the weight ratio of component i) to ii) ranges from 1000:1 to 2:1 or
  b3) any mixture of b1) and b2).

This resin system provides better opacity. In a more preferred embodiment, the weight ratio of component i) to ii) is 500:1 to 10:4, more preferably 500:1 to 5:1, more preferably 200:1 to 10:3, and most preferably 200:1-5:1. The preferred embodiments of the resin component/resin system b) with respect to its constituent b1), b2) and b3) are identical to those mentioned on the previous pages for the titanium dioxide composition, which comprises resin system b).

Another further embodiment of the present invention is a method for the preparation of a masterbatch composition comprising the steps:
  a) providing a composition according to the present invention, and
  b) melt mixing the composition provided in step a) at a temperature of at least 60° C.

Preferably melt mixing step b) is conducted at a temperature in the range of 70 to 200° C., more preferably in a range of 80 to 140° C.

According to a preferred embodiment melt mixing step b) is conducted for at least 30 sec, more preferably in a range from 40 to 120 sec.

Preferably the composition according to the present invention is premixed at 25° C. The premixing step can be conducted in a blender drum for a time sufficient to thoroughly mix the component of the composition according to the present invention, e.g. 10 to 20 min.

The melt mixing step is preferably conducted in an extruder, more preferably in a single screw extruder such as Buss TCS 30 or in a twin screw extruder. In the extruder the composition provided in step a) is melt mixed, preferably at a temperature of 60 to 200° C., more preferably 70 to 140° C. and a residence time of at least 30 sec, more preferably for a residence time in a range from 40 to 120 sec.

A further embodiment of the present invention is a masterbatch composition which is obtainable or obtained by the method for the preparation of a masterbatch composition according to the present invention.

The masterbatch composition of the invention is used as an essential component of a powder coating composition in order to increase the opacity of the cured powder coatings made thereof.

A further embodiment of the present invention is a method for the preparation of a powder coating composition comprising the steps:
  a) preparing a masterbatch composition according to the method for the preparation of a masterbatch composition of the present invention, and
  b) mixing the masterbatch composition obtained in step a) with a composition comprising an organic compound (C) containing at least one functional group selected from the group consisting of carboxyl, anhydride and phenolic hydroxy.

Preferably, the masterbatch composition according to the present invention is premixed with the organic compound (C) and optionally other components of the powder coating composition at 25° C. for preferably 10 to 20 min.

According to a preferred embodiment step b) is a melt mixing step, which is conducted at a temperature of at least 60° C., preferably in the range of 70 to 200° C., more preferably in a range of 80 to 140° C. Preferably, step b) is a melt mixing step which is conducted for at least 30 sec, preferably in a range from 40 to 120 sec.

The melt mixing step is preferably conducted in an extruder, more preferably in a single screw extruder or a twin screw extruder at a temperature of 60 to 200° C. and preferably at a residence time of at least 30 sec, preferably 40 to 120 sec.

Optionally, the extrudate obtained is cooled and grinded, e.g. in a Retsch bench mill. Subsequently, the grinded extrudate can be sieved in order to obtain a powder coating composition having a suitable particle size.

Compound (C) used in step b) is preferably selected from the group consisting of carboxyl-functional polyester resins or carboxyl-functional acrylic polymers having free carboxylic groups, dicarboxylic acids, polycarboxylic acids, anhydrides and polyanhydrides or any mixtures thereof.

Preferably, compound (C) is a carboxyl group containing compound which has an acid value between 15 and 200 mg KOH/gram resin and more preferably between 20 and 120 mg KOH/gram resin.

Among the suitable polyesters are those based on a condensation reaction of linear aliphatic, branched aliphatic and cyclo-aliphatic polyols with aliphatic, cyclo-aliphatic and/or aromatic poly carboxylic acids and anhydrides. The ratio of polyol and acids or anhydrides is such that there is an excess of acid or anhydride over alcohol so as to form a polyester which has free carboxylic groups.

Polyesters for use herein can comprise units of, for example, isophthalic acid, terephthalic acid, 2,6-naphthalene dicarboxylic acid, 4,4'-oxybisbenzoic acid, 3,6-dichloro phthalic acid, tetrachloro phthalic acid, tetrahydro phthalic acid, trimellitic acid, pyromellitic acid, hexahydro terephthalic acid (cyclohexane dicarboxylic acid), hexachloro endomethylene tetrahydro phthalic acid, phthalic acid, azelaic acid, sebacic acid, decane dicarboxylic acid, adipic acid, succinic acid, maleic acid, fumaric acid, and mixtures thereof. These acids may be used as such, or, in so far as available as their anhydrides, acid chlorides, and/or lower alkyl esters. Preferably, the polyester is based on at least one of isophthalic acid and/or terephthalic acid. Trifunctional or higher functional acids may be used also. Examples of suitable such acids include trimellitic acid or pyromellitic acid. These tri- or higher functional acids may be used as end groups or to obtain branched polyesters.

Useful polyalcohols comprise, in particular diols which can be reacted with the carboxylic acids to obtain the polyester; preferred are aliphatic diols. Examples are ethylene glycol, propane-1,2-diol, propane-1,3-diol, butane-1,2-diol, butane-1,4-diol, butane-1,3-diol, 2,2-dimethylpropanediol-1,3 (neopentyl glycol), hexane-2,5-diol, hexane-1,6-diol, 2,2-bis-(4hydroxy-cyclohexyl)-propane (hydrogenated bisphenol-A), 1,4-dimethylolcyclohexane, diethylene glycol, dipropylene glycol, 2,2-bis[4-(2-hydroxy ethoxy)-phenyl]propane, the hydroxy pivalic ester of neopentyl glycol, 2-ethyl-2-butyl propanediol-1,3 (butylethylpropane diol), 2-ethyl-2-methyl propanediol-1,3 (ethylmethylpropane diol) and 2-methylpropanediol-1,3 (MP-Diol).

Tri- or higher functional alcohols may be used in order to obtain branched polyesters. Examples of suitable such polyols include glycerol, hexanetriol, trimethylol ethane, trimethylol propane, tris-(2-hydroxyethyl)-isocyanurate, penta erythritol and sorbitol.

The polyester may be prepared according to conventional procedures by esterification or transesterification, optionally in the presence of customary esterification catalysts for example dibutyltin oxide or tetrabutyl titanate. Preparation conditions and the COOH/OH ratio can be selected so as to obtain end products that have a particular desired acid number and/or a hydroxyl number.

The equivalent ratio between the reactive groups in the polymer to epoxy groups (e.g. carboxyl groups in the polymer and epoxy groups in the masterbatch composition) is usually between 1.6:1 and 0.5:1, and is preferably between 1:1 and 0.8:1.

A carboxylic acid functional polyester is preferably prepared in a series of steps. In the last step of which an aromatic or, preferably, aliphatic acid is esterified so as to obtain an acid-functional polyester. As known to those skilled in the art, in an initial step terephthalic acid is allowed to react in the presence of an excess of diol. Such reactions produce a mainly hydroxyl functional polyester. In a second or subsequent step, an acid functional polyester is obtained by allowing further acid to react with the product of the first step. A further acid includes, among others, isophthalic acid, adipic acid, succinic anhydride, 1,4-cyclohexane dicarboxylic acid and trimellitic anhydride. If trimellitic anhydride is used at a temperature of 170-200° C., a polyester with a relatively high number of trimellitic acid end groups is obtained.

Examples of such polymers capable of reacting with epoxy groups include polyacrylates, polyurethanes, polyethers and polyesters. Among the suitable polymers, polyesters, bisphenol based polyethers and polyacrylates are particularly preferred. With these polymers, various properties can be adjusted in the powder coating. Polyacrylates exhibit very good resistance to yellowing and to weather effects. Polyurethanes are usually wear resistant. Bisphenol based polyethers have good mechanical properties and very good corrosion resistance, while polyesters appear to have very good mechanical properties and do not yellow if the raw materials are suitably selected.

Polyacrylates

Polyacrylates useful herein as the polymer reactable with epoxy groups can be based on (meth)acrylic acid, methyl (meth)acrylate, ethyl (meth)acrylate, butyl (meth)acrylate, propyl (meth)acrylate, 2-ethylhexyl (meth)acrylate, cyclohexyl (meth)acrylate, decyl (meth) acrylate, isodecyl (meth) acrylate, benzyl (meth)acrylate and hydroxyalkyl (meth) acrylates such as hydroxyethyl (meth)acrylate and hydroxypropyl (meth)acrylate and/or glycidyl esters or glycidyl ethers of alkyl (meth) acrylates. By preference, the polyacrylates are substantially vinyl chloride-free. The polyacrylates can be obtained by known methods. In these methods, co-monomers such as, for example, styrene, maleic acid/anhydride, as well as small amounts of ethylene, propylene and acrylonitrile, can be used.

A polyacrylate containing epoxy groups is obtained by using glycidyl (meth)acrylates in the synthesis of the polyacrylate.

A polyacrylate containing acid groups is usually obtained by radical copolymerization of the desired amount of acid, such as, for example, (meth)acrylic acid, maleic acid or fumaric acid.

The composition comprising the organic compound containing at least one carboxyl group, preferably additionally comprises one or more additive(s) selected from the group consisting of pigment, filler, flow agent, matting agent, degassing aids, curing catalysts, or any mixtures thereof.

Very suitable additives include for example additives which improve the tribo-charging properties of a polyester/epoxy system and additives which inhibit discoloration that may be caused by overbake or hardening in a gas oven.

The additives may comprise a flow-promoting agent, a degassing agent and if desired a stabilizer and/or a catalyst.

A further embodiment of the present invention is a powder coating composition obtainable or obtained by the method for the preparation of the powder coating composition according to the present invention.

A further embodiment of the present invention is a cured powder coating obtainable or obtained by heating a powder coating composition according to the present invention.

Preferably the powder coating composition according to the present invention can be thermally cured. Generally, the powder coating composition is applied on a surface, e.g. a metal sheet, and subsequently the applied powder coating composition is heat cured preferably at a temperature of 150 to 250° C., more preferably 170 to 230° C., most preferably 180 to 200° C. Heat curing is preferably conducted for 5 to 40 min, more preferably 10 to 20 min. The powder coating composition according to the present invention can be applied on a substrate by techniques known to the person skilled in the art, e.g. electrostatic spraying. The film thickness of the cured powder coating composition on a substrate is preferably 20 to 100 µm, more preferably 30 to 90 µm and most preferably 40 to 70 µm.

A further embodiment of the present invention is the use of a composition according to the present invention or a masterbatch composition according to the present invention for a powder coating composition or for increasing the opacity of a cured powder coating.

The cured powder coatings according to the present invention can be prepared with reduced film thickness while maintaining a high level of opacity compared to $TiO_2$-based powder coatings in the prior art. Additionally, since reduced film thicknesses can be used to obtain the same degree of opacity curing material and cure energy can be saved.

EXAMPLES

The following components mentioned in Table A are used in the examples:

TABLE A

| Component | supplier and description |
|---|---|
| TiO$_2$ particles | Tioxide TR 92 ® ex Huntsman<br>TiO$_2$ content: min. 92.5%<br>Inorganic coating: Alumina, Zirconia<br>Organic coating: Present<br>Particle size: 0.24 µm<br>Oil absorption (Palette-knife method- ISO 787/5: 1980): 18 cm$^3$/100 g |
| BaSO$_4$ | Blanc Fix N ® ex Sachtleben Chemie GmbH<br>Synthetic Barium Sulfate<br>BaSO$_4$ content (DIN EN ISO 3262-3): approx 99%<br>pH (DIN EN ISO SC 209): approx. 9<br>Median Value d$_{50}$ (Sed) (DIN EN ISO SC 216): approx. 3 µm |
| Benzoine | Benzoine ex Fluka<br>Degasing agent |
| Uralac ® P 5170 | Uralac ® P 5170 ex DSM<br>Solid saturated polyester resin with carboxylic end groups for so-called polyester/epoxy hybrid powder coatings<br>The carboxylated polyester resin for powder coatings is a polymer on basis of ethylene glycol, neopentyl glycol, terephthalic acid and adipic acid.<br>Acid value 32-38 (mg KOH necessary to neutralise the acid constituents in 1 g polyester resin).<br>Tg: approx. 54° C. (DSC determined at 5° C./min) |
| Araldite ® GT 6750 | Araldite ® GT 6750 ex Huntsman<br>Solid epoxy resin obtained via reaction of bisphenol A with liquid bisphenol A diglycidyl ether. This resin contains 2.5% flow agent (liquid polybutyl acrylate).<br>Epoxy content: 1.31-1.42 eq/kg (ISO 3001)<br>Softening temperature (Mettler, DIN 51920): 87° C. |
| Uralac ® P 770 | Uralac ® P 770 ex DSM<br>Solid saturated polyester resin with carboxylic end groups for so-called polyester/epoxy hybrid powder coatings with high TiO$_2$ loading.<br>Carboxylated polyester resins made of ethylene glycol, terephthalic acid and adipic acid<br>Acid value (mg KOH/g): 32-38 |
| Matrimid ® 5292 A | Matrimid ® 5292 A ex Huntsman<br>4,4'-bismaleimidodiphenylmethane |
| Hycar ® ATBN 1300X35 | Hycar ® ATBN 1300/35 ex NOVEON<br>Amine terminated butadiene-acrylonitrile copolymer:<br>Molecular weight: approx 3400<br>Amine value: 80 |
| Hycar ® CTBN 1300X13 | Hycar ® 1300X13 ex Noveon<br>Carboxyl terminated butadiene acrylonitrile copolymer<br>Molecular weigh: approx 3150<br>Acid value: 32 |
| Pripol ® 1017 | Pripol ® 1017 ex Uniquema<br>Dimerized fatty acid (unsaturated)<br>Acid value (mg KOH/g): 190-197 |
| Acronal ® 4F | Acronal ® 4F ex BASF; flow agent<br>Liquid polymer based on polybutyl acrylate;<br>viscosity at 23° C. (50% in ethyl acetate-ISO 3219): 130-200 mPas |
| Araldite ® GY 260 | Liquid, high viscosity unmodified epoxy resin based on bisphenol-A ex Huntsman<br>Epoxy content (ISO 3001): 5.20-5.49 eq/kg<br>Viscosity at 25% (40% in butylcarbitol; falling ball, ISO 12058-1): 12000-16000 mPas. |
| Catalyst | Benzalkonium chloride |
| Araldite ® GT 7071 | Epoxy resin ex Huntsman with medium molecular weight based on bisphenol-A ex Huntsman<br>epoxy content: 1.9-2.0 eq/kg |
| Joncryl ® SCX 819 | Solid Acrylic resin (BASF)/Acid value 75 |

I) General Procedure for the Preparation of the Masterbatch Composition

The TiO$_2$ particles and the epoxy resin b1 or mixture b2) or b3) are premixed in a blender drum at 25° C. for 20 min. Subsequently, the premixed composition is melt mixed in a single screw extruder (TCS 30 ex Buss; Switzerland) at a temperature of 125° C. and a residence time of 30 sec (screw speed: 400 rpm).

1.) Masterbatch Composition A a) Preparation of a Mixture A

A solid mixture A is obtained by mixing and heating the following composition at a temperature of 145-148° C. for 4 hours.

| Component | Amount in wt.-% |
|---|---|
| Araldite ® GY 260 | 67.85% |
| Bisphenol-A | 21.6% |
| tert-butylphenol | 4.9% |
| Acronal ® 4F | 2.5% |
| Catalyst | 0.15% |
| Matrimide ® 5292 A | 3.0% |

The mixture obtained has an epoxy content of 1.35 eq/kg and corresponds to a resin system according claim 15.

b) Composition A According to the Present Invention is Obtained by Mixing 32 wt.-% of the Mixture A with 68 wt.-% TIOXIDE TR 92.

Masterbatch composition A according to the present invention is obtained by melt mixing composition A as described above in the general procedure.

2.) Masterbatch Composition B a) Preparation of Epoxy Resin B

A solid epoxy resin B is obtained by reacting 90 wt.-% of the solid epoxy resin Araldite® GT 6750 with 10 wt.-% Pripol® 1017 at a temperature of 128-133° C. for 4 hours. The modified epoxy resin B obtained has an epoxy content of: 1.05 eq/kg and corresponds to a resin system according claim 15.

b) Composition B According to the Present Invention is Obtained by Mixing 23 wt.-% of Epoxy Resin B with 77 wt.-% TIOXIDE® TR 92.

Masterbatch composition B according to the present invention is obtained by melt mixing composition B as described above in the general procedure.

3.) Masterbatch Composition C a) Preparation of Epoxy Resin C

A solid epoxy resin C is obtained by mixing and heating the following composition at a temperature of 148-150° C. for 4 hours.

| Component | Amount in wt.-% |
|---|---|
| Araldite ® GY 260 | 68.00% |
| Bisphenol-A | 21.6% |
| tert-butylphenol | 4.9% |
| Acronal ® 4F | 2.5% |
| Catalyst | 0.15% |
| Hycar ® ATBN 1300/35 | 3.0% |

The epoxy resin C obtained has an epoxy content of 1.24 eq/kg and corresponds to a resin system according claim 15.

b) Composition C According to the Present Invention is Obtained by Mixing 32 wt.-% of Epoxy Resin C with 68 wt.-% TIOXIDE® TR 92.

Masterbatch composition C according to the present invention is obtained by melt mixing composition C as described above in the general procedure.

4.) Masterbatch Composition D a) Preparation of Epoxy Resin D

Solid epoxy resin D is obtained by mixing and heating the following composition at a temperature of 140-145° C. for 4 hours. The resin corresponds to a resin system according claim 15.

| Component | Amount in wt.-% |
|---|---|
| Araldite ® GY 260 | 68.00% |
| Bisphenol-A | 21.6% |
| tert-butylphenol | 4.9% |
| Acronal ® 4F | 2.5% |
| Catalyst | 0.15% |
| Hycar ® CTBN 1300X13 | 3.0% | b) Composition D According to the Present Invention is Obtained by Mixing 43.7 wt.-% of Epoxy Resin D with 56.3 wt.-% TIOXIDE® TR 92.

Masterbatch composition D according to the present invention is obtained by melt mixing composition D as described above in the general procedure.

5.) Masterbatch Composition E

Masterbatch composition E according to the present invention is obtained by melt mixing the following composition as described above in the general procedure.

| Component | Amount in wt.-% |
|---|---|
| Araldite ® GT 6750 | 31.04 |
| Matrimide ® 5292A | 0.96 |
| Tioxide ® TR 92 | 68.0 |

6.) Masterbatch Composition F a) Preparation of Epoxy Resin F

Epoxy resin F is obtained by mixing and heating 97.1 wt.-% Araldite® GT 7071(epoxy content 1.9-2.0 Eq/kg) with 2.9% butyne diol at a temperature of 151-155° C. for 4 hours.

Epoxy resin F obtained has an epoxy content of 1.5 eq/kg and corresponds to a resin system according claim 15.

b) Composition F According to the Present Invention is Obtained by Mixing 32 wt.-% of Epoxy Resin F with 68 wt.-% TIOXIDE® TR 92.

Masterbatch composition F according to the present invention is obtained by melt mixing composition F as described above in the general procedure.

7.) Masterbatch Composition G a) Preparation of Epoxy Resin G

Epoxy resin G is obtained by mixing and heating 97.1 wt.-% Araldite® GT 7071(epoxy content 1.9-2.0 eq/kg) with 2.9% acetylene diacid at a temperature of 150-153° C. for 4 hours.

Epoxy resin G obtained has an epoxy content of 1.59 eq/kg and corresponds to a resin system according claim 15.

b) Composition G According to the Present Invention is Obtained by Mixing 32 wt.-% of Epoxy Resin G with 68 wt.-% TIOXIDE® TR 92.

Masterbatch composition G according to the present invention is obtained by melt mixing composition G as described above in the general procedure.

8.) Masterbatch Composition H

Composition H according to the present invention is obtained by mixing 32 wt.-% of epoxy resin D with 68 wt.-% TIOXIDE® TR 92.

Masterbatch composition H according to the present invention is obtained by melt mixing composition H as described above in the general procedure.

9.) Epoxy Resin J

Solid epoxy resin J is obtained by mixing and heating the following composition at a temperature of 150-155° C. for 4 hours. Epoxy resin J corresponds to a resin system according claim 15.

| Component | Amount in wt.-% |
|---|---|
| Araldite ® GY 260 | 48.29% |
| Bisphenol-A | 19.86% |
| Acronal ® 4F | 2.5% |
| Catalyst | 0.15% |
| Hycar ® CTBN 1300X13 | 29.20% |

10) Masterbatch K a) Epoxy resin Araldit® GT 6750 (epoxy content 1.31-1.42 Eq/kg) is mixed with 3% Probimer 5292A (Bismaleimide/Huntsman) giving modified resin K (epoxy content Eq/kg) and corresponds to a resin system according claim 15.

b) Modified resin K is mixed with TiO2 Tioxide TR 92 via extrusion (Processing: Extruder Buss TCS 30, 400 rpm, 125° C.); modified resin K/TR 92 ratio: 38.5/61.5.

II) General Procedure for the Preparation of the Powder Coating Composition as Well as the Cured Powder Coatings.

The powder coating composition which are described in the following tables have been prepared by the following general procedure.

The components of the powder coating composition are premixed in a blender drum at 25° C. for 20 min. Subsequently, the premixed composition is melt mixed in a single screw extruder (TCS 30 ex Buss; Switzerland) at a temperature of 80° C. and a screw speed of 400 rpm and a residence time of 30 sec.

Subsequently, the obtained extrudate is cooled to room temperature and grinded in a Retsch bench mill. The grinded extrudate is sieved on a 60 microns screen.

The powder coating composition obtained is applied on standard white/black contrast panels (T124 Metopac® ex Leneta) by electrostatic spraying with a Gema electrostatic gun. Subsequently, the coated panels are heated in an electrical oven at 200° C. for 20 min.

III) Determination of the Parameters

The test panels with the thermally cured powder coating composition have been analysed as follows:

a) Minimum Film Thickness for Opacity

The minimum film thickness for opacity defines the minimum film thickness which is sufficient that the black and white underlying coatings cannot be distinguished beneath the cured powder coating. The minimum film thickness which does not allow to distinguish between the coated black area and the coated white area of the panel is visually determined by three person.

b) Parameter "$\Sigma$"

Optical colour parameter difference ($\Delta L$ and $\Delta E$) between the white and the black parts of contrast white/black panels in the range of film thickness 50-90 µm has been determined according to the following formula:

$$\Sigma = \Delta L(\text{White-Black})(50\ \mu m) + \Delta L(\text{White-Black})(60\ \mu m)\Delta L(\text{White-Black})(90\ \mu m) + \Delta E(\text{White-Black})(60\ \mu m) + \Delta L(\text{White-Black})(75\ \mu m)\Delta L(\text{White-Black})(90\ \mu m)$$

The values in parenthesis indicate the thickness of the cured powder coating on the test panel.

$\Delta L$ and $\Delta E$ are determined according to the CIELAB (CIE 1976) on a Tricolor II apparatus of Dr. Lange, Germany.

The lower $\Sigma$ the higher the opacity and, as a consequence the lower the minimum film thickness which does not allow to distinguish between the coated black area and the coated white area of the panel.

c) Parameter "Ω"

Optical colour parameter difference between the white and the black parts of contrast white/black panels in the range of film thickness 30-60 μm has been determined according to the following formula:

$$\Omega = \Delta L(\text{White-Black})(30\ \mu m) + \Delta L(\text{White-Black})(40\ \mu m) + \Delta L(\text{White-Black})(50\ \mu m) + \Delta L(\text{White-Black})(60\ \mu m) + \Delta E(\text{White-Black})(30\ \mu m) + \Delta E(\text{White-Black})(40\ \mu m) + \Delta E(\text{White-Black})(50\ \mu m) + \Delta E(\text{White-Black})(60\ \mu m)$$

The values in parenthesis indicate the thickness of the cured powder coating on the test panel.

ΔL and ΔE are determined according to the CIELAB (CIE 1976) on a Tricolor II apparatus of Dr. Lange, Germany.

The lower Ω the higher the opacity and, as a consequence the lower the minimum film thickness which does not allow to distinguish between the coated black area and the coated white area of the panel.

All components below are given in weight %.

TABLE 1

| | Powder coating composition | |
|---|---|---|
| Components | Comparative Example 1C | Example 1 |
| Uralac ® P 5170 | 38.50 | 38.50 |
| Araldite ® GT 6750 | 16.50 | — |
| Materbatch composition A | — | 51.50 |
| Tioxide ® TR 92 | 35.0 | — |
| BaSO$_4$ | 9.70 | 9.70 |
| Benzoine | 0.30 | 0.30 |
| TiO$_2$ content (wt.-%) | 35 | 35 |
| Processing conditions | Extruder Buss TCS 30, 400 rpm, 80° C. | |
| Coating substrate/Cure | White/Black contrast panels/200° C.-20 min | |
| Minimum film thickness for opacity | 85 μm | 50 μm |
| Σ | 2.1 | 0.6 |
| Ω | 7.0 | 4.6 |

TABLE 2

| | Powder coating composition | | | | |
|---|---|---|---|---|---|
| Components | Comparative Example 2C | Example 2 | Comparative Example 3C | Example 3 | Example 4 |
| Uralac ® P 770 | 38.5 | — | 34.8 | — | — |
| Uralac ® P 5170 | — | 38.5 | — | 34.7 | 45.30 |
| Araldite ® GT 6750 | 16.5 | — | 14.9 | — | — |
| Masterbatch composition B | — | — | — | 65.0 | — |
| Masterbatch composition C | — | 51.5 | — | — | — |
| Masterbatch composition D | — | — | — | — | 44.40 |
| TiO$_2$ particles | 35.0 | — | 50.0 | — | — |
| BaSO$_4$ | 9.7 | 9.7 | — | — | 10.00 |
| Benzoine | 0.3 | 0.3 | 0.3 | 0.3 | 0.3 |
| Sum | 100 | 100 | 100 | 100 | 100 |
| TiO$_2$ content wt-% | 35 | 35 | 50 | 50 | 25 |
| Processing conditions | Extruder Buss TCS 30, 400 rpm, 80° C. | | | | |
| Substrate/Cure conditions | White/Black contrast panels/200° C.-20 min | | | | |
| Minimum film thickness for full coverage | 85 | 45 | 75 | 45 | 55 |
| Σ | 3.3 | 0.2 | 1.6 | 0.1 | 1.4 |
| Ω | 10.2 | 5.2 | 6.6 | 4.4 | 7.6 |

TABLE 3

| | Powder coating composition | | | |
|---|---|---|---|---|
| Components | Comparative Example 4C | Example 5 | Example 6 | Comparative Example 5C |
| Uralac ® P 5170 | 38.50 | 38.50 | 38.50 | 38.15 |
| Araldite ® GT 6750 | 16.50 | — | — | 16.35 |
| Masterbatch composition A | — | 51.50 | — | — |
| Masterbatch composition E | — | — | 51.5 | — |
| Matrimid ® 5292 A | — | — | — | 0.50 |
| Tioxide ® TR 92 | 35.0 | — | — | 35.00 |
| BaSO$_4$ | 9.70 | 9.70 | 9.70 | 9.70 |
| Benzoine | 0.30 | 0.30 | 0.30 | 0.30 |
| Sum | 100 | 100 | 100 | 100 |
| TiO$_2$ content (wt.-%) | 35 | 35 | 35 | 35 |
| Processing conditions | Extruder Buss TCS 30, 400 rpm, 80° C. | | | |
| Coating substrate/Cure | White/Black contrast panels/200° C.-20 min | | | |
| Minimum film thickness for opacity (1) | 85 μm | 50 μm | 65 μm | 70 μm |
| Σ (2) | 2.1 | 0.6 | 0.8 | 1.8 |
| Ω (3) | 7.0 | 4.6 | 7.1 | 9.2 |

TABLE 4

| | Powder coating composition | | | |
|---|---|---|---|---|
| Components | Example 7 | Comparative Example 6C | Example 8 | Comparative Example 7C |
| Uralac ® P 5170 | 38.50 | 38.15 | 38.50 | 38.15 |
| Araldite ® GT 6750 | — | 16.35 | — | 16.35 |
| Masterbatch composition F | 51.5 | — | — | — |
| Butyne diol | — | 0.50 | — | — |

TABLE 4-continued

Powder coating composition

| Components | Example 7 | Comparative Example 6C | Example 8 | Comparative Example 7C |
|---|---|---|---|---|
| Masterbatch composition G | — | — | 51.50 | — |
| Acetylene diacid | — | — | — | 0.50 |
| Tioxide ® TR 92 | — | 35.00 | — | 35.00 |
| BaSO$_4$ | 9.70 | 9.70 | 9.70 | 9.70 |
| Benzoine | 0.30 | 0.30 | 0.30 | 0.30 |
| Sum | 100 | 100 | 100 | 100 |
| TiO$_2$ content wt.-% | 35 | 35 | 35 | 35 |
| Processing conditions | Extruder Buss TCS 30, 400 rpm, 80° C. | | | |
| Coating substrate/Cure | White/Black contrast panels/200° C.-20 min | | | |
| Minimum film thickness for opacity | 60 μm | 65 μm | 60 μm | 75 μm |
| Σ | 1.6 | 2.2 | 1.8 | 3.3 |
| Ω | 8.1 | 10.6 | 8.0 | 11.8 |

TABLE 5

Powder coating composition

| Components | Example 9 | Comparative Example 8C |
|---|---|---|
| Uralac ® P 5170 | 41.80 | 41.80 |
| Masterbatch composition H | 57.90 | — |
| Araldite ® GT 6750 | — | 16.68 |
| Modified resin J | — | 1.85 |
| Tioxide ® TR 92 | — | 39.37 |
| Benzoine | 0.3 | 0.30 |
| Sum | 100 | 100 |
| TiO$_2$ content wt.-% | 40.00 | 40.00 |
| Processing conditions | Extruder Buss TCS 30, 400 rpm, 80° C. | |
| Coating substrate/Cure | White/Black contrast panels/200° C.-20 min | |
| Minimum film thickness for opacity | 50 μm | 65 μm |
| Σ | 0 | 1.4 |
| Ω | 2.9 | 6.3 |

TABLE 6

Powder coating composition (50/50 polyester/epoxy hybrids)

| | Comparative Example 9C | Example 10 |
|---|---|---|
| Uralac ® P 5998 (1) | 25 | 25 |
| Araldite ® GT 6750 (2) | 25 | — |
| Masterbatch K | — | 65 |
| Tioxide ® TR92 | 40 | — |
| Blanc Fix ® N (BaSO4) | 9.70 | 9.70 |
| Benzoine | 0.30 | 0.30 |
| Sum | 100 | 100 |
| TiO$_2$ content wt.-% | 40.00 | 40.00 |
| Processing conditions | Extruder Buss TCS 30, 400 rpm, 80° C. | |
| Coating substrate/Cure | White/Black contrast panels/200° C.-20 min | |
| Minimum film thickness for opacity (3) | 80 μm | 60 μm |
| Σ | 3.4 | 1.5 |
| Ω | 11.4 | 8.4 |

TABLE 7

Powder coating composition (50/50 Acrylic/epoxy hybrids)

| Formulation | Trial N° Comparative Example 10C | Example 11 |
|---|---|---|
| Joncryl ® SCX 819 (1) | 25 | 25 |
| Araldite ® GT 6750 (2) | 25 | — |
| Masterbatch K | — | 65 |
| Tioxide ® TR92 | 40 | — |
| Blanc Fix ® N (BaSO4) | 9.70 | 9.70 |
| Benzoine | 0.30 | 0.30 |
| Sum | 100 | 100 |
| TiO$_2$ content wt.-% | 40.00 | 40.00 |
| Processing conditions | Extruder Buss TCS 30, 400 rpm, 80° C. | |
| Coating substrate/Cure | White/Black contrast panels/200° C.-20 min | |
| Minimum film thickness for opacity | 95 | 75 |
| Σ | 4.1 | 2.3 |
| Ω | 11.4 | 9.4 |

The invention claimed is:

1. A composition comprising
   a) at least 50 wt. % of TiO$_2$ particles and
   b) at least 10 wt. % of a component which comprises
   b1) at least one epoxy resin having at least one carbon-carbon double bond and/or at least one carbon-carbon triple bond which are not terminal,
   wherein component b1) is obtained by the reaction of an epoxy resin with an unsaturated component (B), which has at least one carbon-carbon double bond and/or at least one carbon-carbon triple bond which are not terminal and at least one functional group selected from the group consisting of amino, hydroxyl, carboxy and anhydride, and the unsaturated component (B) is an unsaturated fatty acid, a dimerized or trimerized unsaturated fatty acid, polyamidoamine based on an unsaturated fatty acid dimer or trimer, tetrahydrophtalic acid, tetrahydrophtalic anhydride, acetylene dicarboxylic acid, butene diol, a functionalized homopolymer of butadiene or a copolymer of a butadiene with a vinyl or allyl compound selected from the group consisting of acrylonitrile, acrylic acid, methacrylic acid, acrylic or methacrylic acid esters, maleic acid and maleic acid anhydride;
   or
   b2) a mixture of
   i) at least one epoxy resin without a carbon-carbon double bond and without a carbon-carbon triple bond and
   ii) at least one unsaturated organic compound (A) wherein compound (A) is selected from a polybutadiene homopolymer having no functional group capable of reacting with an epoxide group, a polybutadiene copolymer having no functional group capable of reacting with an epoxide group, a partly epoxidized polybutadiene, 4,4'-bismaleimidodiphenylmethane and a mixture thereof and does not react with the epoxy resin b2i) and the weight ratio of component i) to ii) ranges from 1000:1 to 10:5; or
   b3) any mixture of b1) and b2),
   wherein the weight % is based on the total weight of the composition.

2. The composition according to claim 1 wherein the TiO$_2$ particles are present in an amount ranging from 60 to 90 wt.-%, based on the total weight of the composition.

3. The composition according to claim 1 wherein component b) is present in an amount ranging from 10 to 45 wt.-%, based on the total weight of the composition.

4. The composition according to claim 1 wherein the unsaturated component (B) is selected from the group consisting of unsaturated fatty acid, dimerized or trimerized unsaturated fatty acid, amine terminated butadiene, acrylonitrile copolymer, carboxyl terminated butadiene acrylonitrile copolymer, functionalized and partly epoxidised polybutadiene, polyamidoamine derivatives of unsaturated fatty acid dimer or trimer, tetrahydrophthalic acid anhydride, acetylene dicarboxylic acid, butyne diol, or any mixture or reaction product thereof.

5. The composition according to claim 1 wherein component b1) and/or epoxy resin b2)-i) have a softening temperature of at least 60° C. determined according to DIN 51920 on a Mettler apparatus.

6. A method for the preparation of a masterbatch composition comprising the steps:
   a) providing the composition according to claim 1 and
   b) melt mixing the composition provided in step a) at a temperature of at least 60 C.

7. A masterbatch composition obtained by the method according to claim 6.

8. A method for the preparation of a powder coating composition comprising the steps:
   a) preparing the masterbatch composition as defined in claim 6 and
   b) mixing the masterbatch composition obtained in step a) with a composition comprising na organic compound containing at least one functional group selected from the group consisting of carboxy, anhydride and phenolic hydroxy.

9. A powder coating composition obtained by the method according to claim 8.

10. A cured powder coating obtained by heating the powder coating composition according to claim 9.

11. A resin component b) which comprises
   b1) at least one epoxy resin having at least one carbon-carbon double bond and/or at least one carbon-carbon triple bond which are not terminal, wherein component b1) is obtained by the reaction of an epoxy resin with an unsaturated component (B), which has at least one carbon-carbon double bond and/or at least one carbon-carbon triple bond which are not terminal and at least one functional group selected from the group consisting of amino, hydroxyl, carboxy and anhydride, and the unsaturated component (B) is an unsaturated fatty acid, a dimerized or trimerized unsaturated fatty acid, polyamidoamine based on an unsaturated fatty acid dimer or trimer, tetrahydrophthalic acid, tetrahydrophthalic anhydride, acetylene dicarboxylic acid, butene diol, a functionalized homopolymer of butadiene or a copolymer of a butadiene with a vinyl or allyl compound selected from the group consisting of acrylonitrile, acrylic acid, methacrylic acid, acrylic or methacrylic acid esters, maleic acid and maleic acid anhydride;
   or
   b2) a mixture of
   i) at least one epoxy resin without a carbon-carbon double bond and without a carbon-carbon triple bond and
   ii) at least one unsaturated organic compound (A) wherein compound (A) is selected from a polybutadiene homopolymer having no functional group capable of reacting with an epoxide group, a polybutadiene copolymer having no functional group capable of reacting with an epoxide group, a partly epoxidized polybutadiene, 4,4'-bismaleimidodiphenylmethane and a mixture thereof and does not react with the epoxy resin b2i) and the weight ratio of component i) to ii) ranges from 1000:1 to 10:5; or
   b3) any mixture of b1) and b2),
   wherein the weight % is based on the total weight of the composition.

* * * * *